US009022469B2

(12) United States Patent
Lavelle et al.

(10) Patent No.: US 9,022,469 B2
(45) Date of Patent: May 5, 2015

(54) VEHICLE MOUNTING SYSTEM FOR MOBILE COMPUTING DEVICES

(75) Inventors: Patrick M. Lavelle, Bonita Springs, FL (US); James R. Tranchina, Dix Hills, NY (US)

(73) Assignee: Voxx International Corporation, Hauppauge, NY (US)

( * ) Notice: Subject to any disclaimer, the term of this patent is extended or adjusted under 35 U.S.C. 154(b) by 107 days.

(21) Appl. No.: 13/586,418

(22) Filed: Aug. 15, 2012

(65) Prior Publication Data

US 2013/0119727 A1 May 16, 2013

Related U.S. Application Data

(63) Continuation-in-part of application No. 13/340,946, filed on Dec. 30, 2011, which is a continuation-in-part of application No. 12/851,433, filed on Aug. 5, 2010, which is a continuation-in-part of application No. 12/570,517, filed on Sep. 30, 2009, now abandoned, application No. 13/586,418, which is a continuation-in-part of application No. 13/358,057, filed on Jan. 25, 2012, which is a continuation of application No. 12/160,171, filed on Nov. 24, 2008, now Pat. No. 8,109,569.

(30) Foreign Application Priority Data

Apr. 27, 2007 (WO) ................ PCT/GB2007/001566

(51) Int. Cl.
*A47C 31/00* (2006.01)
*B60N 2/48* (2006.01)
*B60R 11/02* (2006.01)
(Continued)

(52) U.S. Cl.
CPC .......... *B60N 2/4876* (2013.01); *B60R 11/0235* (2013.01); *G06F 3/1423* (2013.01); *G06F 3/147* (2013.01); *H04B 1/082* (2013.01); *H04N 1/00347* (2013.01); *H04N 7/163* (2013.01); *H04N 7/18* (2013.01); *H04N 21/41422* (2013.01); *H04N 21/4341* (2013.01); *H04N 21/43637* (2013.01); *H04N 21/4382* (2013.01); *H04N 21/4622* (2013.01); *H04N 21/6131* (2013.01); *B60R 2011/0015* (2013.01); *B60R 2011/0017* (2013.01); *B60R 2011/0045* (2013.01); *B60R 2011/0075* (2013.01); *G09G 2380/10* (2013.01); *H04N 2201/0041* (2013.01);
(Continued)

(58) Field of Classification Search
CPC ....................................... B60N 2/4876
USPC ............................ 297/217.1, 217.3, 391, 410
See application file for complete search history.

(56) References Cited

U.S. PATENT DOCUMENTS 7,245,274 B2 * 7/2007 Schedivy ........................ 345/7
2003/0137584 A1 * 7/2003 Norvell et al. .................. 348/61
(Continued)

OTHER PUBLICATIONS

International Search Report dated Mar. 8, 2013 for International Appln. No. PCT/US12/70883.
(Continued)

*Primary Examiner* — Philip Gabler
(74) *Attorney, Agent, or Firm* — F. Chau & Associates, LLC

(57) ABSTRACT

A mounting system includes a cradle disposed in a headrest in a vehicle, and a primary adapter. The cradle is shaped and dimensioned to receive the primary adapter. The primary adapter includes first to fourth lips forming a recess in the primary adapter. The recess is shaped and dimensioned to receive a first computing device or a secondary adapter. The first computing device, or a bezel of the secondary adapter, is substantially flush with an outer surface of the headrest upon mounting the first computing device or the secondary adapter to the primary adapter.

20 Claims, 9 Drawing Sheets

(51) Int. Cl.
*G06F 3/147* (2006.01)
*H04B 1/08* (2006.01)
*H04N 1/00* (2006.01)
*H04N 7/16* (2011.01)
*H04N 7/18* (2006.01)
*H04N 21/4363* (2011.01)
*H04N 21/438* (2011.01)
*H04N 21/462* (2011.01)
*H04N 21/61* (2011.01)
*G06F 3/14* (2006.01)
*H04N 21/414* (2011.01)
*H04N 21/434* (2011.01)
*B60R 11/00* (2006.01)
*H04N 5/64* (2006.01)

(52) U.S. Cl.
CPC  *H04N 2201/0058* (2013.01); *H04N 2201/0089* (2013.01); *H04N 5/64* (2013.01)

(56) References Cited

U.S. PATENT DOCUMENTS

| | | | |
|---|---|---|---|
| 2004/0092145 A1* | 5/2004 | Sasame et al. | 439/137 |
| 2004/0227372 A1* | 11/2004 | Lavelle et al. | 296/37.15 |
| 2007/0164609 A1 | 7/2007 | Shalam et al. | |
| 2007/0199028 A1 | 8/2007 | Yau | |
| 2008/0157574 A1* | 7/2008 | LaRussa | 297/217.3 |
| 2008/0304688 A1* | 12/2008 | Kumar | 381/370 |
| 2010/0067884 A1 | 3/2010 | Schedivy | |
| 2011/0131358 A1* | 6/2011 | Ganesh et al. | 710/304 |
| 2011/0134601 A1 | 6/2011 | Sa | |
| 2011/0267759 A1 | 11/2011 | Abram et al. | |

OTHER PUBLICATIONS

Written Opinion dated Mar. 8, 2013 for International Appln. No. PCT/US12/70883.

U.S. Office Action dated Mar. 14, 2014 corresponding to U.S. Appl. No. 13/340,946.

* cited by examiner

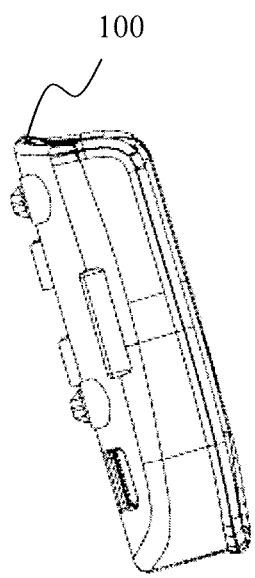
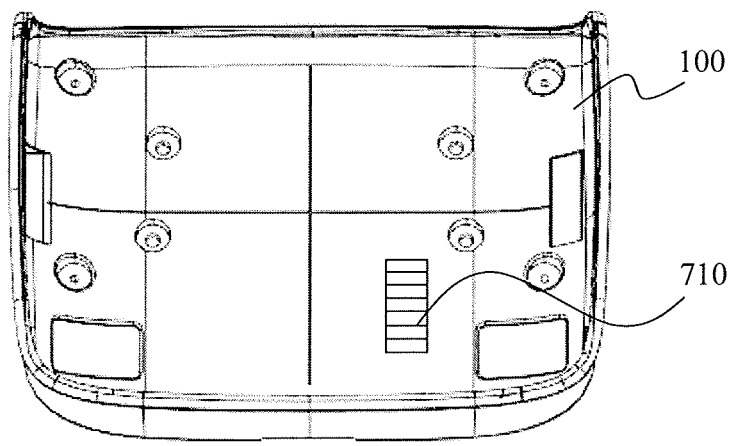
FIG. 1A
FIG. 1B
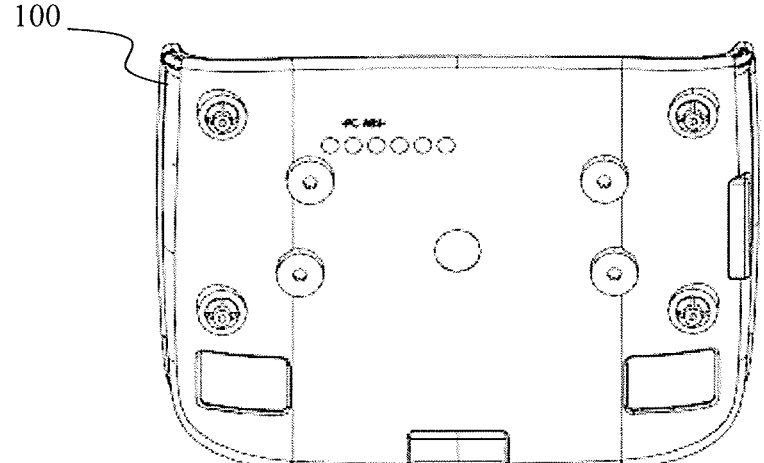
FIG. 1C

VEHICLE MOUNTING SYSTEM FOR MOBILE COMPUTING DEVICES

CROSS-REFERENCE TO RELATED APPLICATIONS

This application is a Continuation-in-Part Application of U.S. application Ser. No. 13/340,946, filed on Dec. 30, 2011, which is a Continuation-in-Part Application of U.S. application Ser. No. 12/851,433, filed on Aug. 5, 2010, which is a Continuation-in-Part Application of U.S. application Ser. No. 12/570,517, filed on Sep. 30, 2009. Further, this application is a Continuation-in-Part of U.S. application Ser. No. 13/358,057, filed on Jan. 25, 2012, which is a Continuation Application of U.S. application Ser. No. 12/160,171, filed on Nov. 24, 2008, which claims priority to International Application Number PCT/GB2007/001566, filed on Apr. 27, 2007, the contents of which are herein incorporated by reference in their entirety.

TECHNICAL FIELD

The present disclosure relates to a vehicle entertainment cradle, and more particularly to a vehicle entertainment cradle configured to allow different sized mobile computing devices, including different sized tablet computers and smartphones, to be mounted within the cradle.

DISCUSSION OF RELATED ART

As society becomes more mobile and spends a greater amount of time traveling and away from home, demand rises for electronic devices that can be used outside the home environment. Mobile computing devices, including tablet computers and smartphones such as the Apple® iPad® and Apple® iPhone®, are becoming more prevalent in today's society due to the ease in which they can be used in a mobile environment. These mobile computing devices are frequently used to view media content while traveling in vehicles.

BRIEF SUMMARY

According to an exemplary embodiment, a mounting system includes a cradle disposed in a headrest in a vehicle, and a primary adapter. The cradle is shaped and dimensioned to receive the primary adapter. The primary adapter includes a first lip, a second lip opposing the first lip, a third lip, and a fourth lip opposing the third lip. The first to fourth lips extend outward from an inner surface of the primary adapter and form a recess in the primary adapter. The recess is shaped and dimensioned to receive one of a first computing device and a secondary adapter. The first computing device or a bezel of the secondary adapter is substantially flush with an outer surface of the headrest upon mounting the first computing device or the secondary adapter to the primary adapter.

In an exemplary embodiment, a notch is disposed on the first to fourth lips near the inner surface of the primary adapter. The notch is shaped and dimensioned to receive first to fourth edges of the secondary adapter, and first to fourth edges of the first computing device.

In an exemplary embodiment, a recess is formed in the cradle. The recess formed in the cradle is defined by a distance between a front surface of the cradle and a portion of the headrest furthest from the front surface of the cradle, and the recess formed in the primary adapter is disposed within the recess formed in the cradle upon mounting the primary adapter to the cradle.

In an exemplary embodiment, the secondary adapter includes a first lip, a second lip opposing the first lip, a third lip, and a fourth lip opposing the third lip. The first to fourth lips of the secondary adapter extend outward from an inner surface of the secondary adapter and form a recess in the secondary adapter. The recess is shaped and dimensioned to receive a second computing device. The second computing device is substantially flush with the bezel of the secondary adapter upon mounting the second computing device to the secondary adapter.

In an exemplary embodiment, the recess formed in the secondary adapter is disposed within the recess formed in the primary adapter upon mounting the secondary adapter to the primary adapter.

In an exemplary embodiment, a depth of the recess formed in the secondary adapter is defined by a distance between the inner surface of the secondary adapter and a portion of the first to fourth lips of the secondary adapter furthest from the inner surface of the secondary adapter. The depth may be between about 0.25 inches and about 0.5 inches.

In an exemplary embodiment, the cradle is electrically coupled to at least one of a power source of the vehicle and an audio/video system of the vehicle.

In an exemplary embodiment, a first electrical connection is disposed on a front surface of the cradle, a second electrical connection is disposed on a rear surface of the primary adapter, a first connection port is disposed on one of the first to fourth lips of the primary adapter, a connector is disposed on one of first to fourth outer edges of the secondary adapter, and a second connection port is disposed on one of the first to fourth lips of the secondary adapter. The first and second electrical connections are electrically coupled upon mounting the primary adapter to the cradle, and the first connection port and the connector are electrically coupled upon mounting the secondary adapter to the primary adapter.

In an exemplary embodiment, a door is pivotally attached to one of the first to fourth lips of the primary adapter. The first connection port is disposed on the door, and the door is configured to pivot away from the lip to receive the secondary adapter or the first computing device, and towards the lip to secure the secondary adapter or the first computing device within the primary adapter.

In an exemplary embodiment, the first connection port is configured to supply power to the first computing device or the secondary adapter, and transmit and receive data to and from the first computing device or the secondary adapter.

In an exemplary embodiment, a door is pivotally attached to one of the first to fourth lips of the secondary adapter. The second connection port is disposed on the door, and the door is configured to pivot away from the lip to receive the second computing device, and towards the lip to secure the second computing device within the secondary adapter.

In an exemplary embodiment, the second connection port is configured to supply power to the second computing device, and transmit and receive data to and from the second computing device.

In an exemplary embodiment, a depth of the recess formed in the primary adapter is defined by a distance between the inner surface of the primary adapter and a portion of the first to fourth lips furthest from the inner surface. The depth may be between about 0.25 inches and about 0.6 inches.

In an exemplary embodiment, the first computing device is a tablet computer having a size between about 7 inches and about 10 inches, and the secondary adapter is shaped and dimensioned to receive a smartphone having a size between about 3 inches and about 7 inches.

In an exemplary embodiment, the secondary adapter is shaped and dimensioned to receive a second computing device having a smaller size than the first computing device.

In an exemplary embodiment, the cradle includes a first sidewall, a second sidewall opposing the first sidewall, a lower wall, and an opening opposing the lower wall. The primary adapter includes an upper wall extending from an upper portion of the primary adapter towards the front surface of the cradle. The upper wall is configured to fit within the opening of the cradle.

According to an exemplary embodiment, a mounting system includes a cradle disposed in a headrest in a vehicle, and a primary adapter. The cradle is shaped and dimensioned to receive the primary adapter. The primary adapter is shaped and dimensioned to receive a tablet computer. Upon mounting the primary adapter to the cradle, a bezel of the primary adapter is substantially flush with an outer surface of the headrest. Upon mounting the tablet computer to the primary adapter, a front surface of the tablet computer is substantially flush with the bezel of the primary adapter.

In an exemplary embodiment, a secondary adapter is shaped and dimensioned to receive a smartphone, and the primary adapter is shaped and dimensioned to receive the secondary adapter. Upon mounting the secondary adapter to the primary adapter, a bezel of the secondary adapter is substantially flush with the bezel of the primary adapter. Upon mounting the smartphone to the secondary adapter, a front surface of the smartphone is substantially flush with the bezel of the secondary adapter.

In an exemplary embodiment, the primary adapter is received into a first recess formed in the cradle upon mounting the primary adapter to the cradle, the secondary adapter is received into a second recess formed in the primary adapter upon mounting the secondary adapter to the primary adapter, and the smartphone is received into a third recess formed in the secondary adapter upon mounting the smartphone to the secondary adapter. Upon mounting the primary adapter to the cradle, the secondary adapter to the primary adapter, and the smartphone to the secondary adapter, the second and third recesses are disposed within the first recess.

According to an exemplary embodiment, a mounting system includes a cradle disposed in a headrest in a vehicle, and a primary adapter. The cradle is shaped and dimensioned to receive the primary adapter. The primary adapter is shaped and dimensioned to receive a tablet computer or a smartphone. The tablet computer or smartphone is secured to the primary adapter by inserting an edge of the tablet computer or smartphone into a notch formed in a recess in the primary adapter, and a front surface of the tablet computer or smartphone is substantially flush with an outer surface of the headrest upon mounting.

According to an exemplary embodiment, a mounting system includes a cradle, a primary adapter, and a secondary adapter. The primary adapter is coupled to a seat in a vehicle and is shaped and dimensioned to receive the primary adapter. The primary adapter is shaped and dimensioned to receive a first computing device having a first size, or the secondary adapter. The secondary adapter is shaped and dimensioned to receive a second computing device having a second size smaller than the first size.

In an exemplary embodiment, the cradle is coupled to at least one headrest post of a headrest in the vehicle.

In an exemplary embodiment, the primary adapter is received into a first recess formed in the cradle upon mounting the primary adapter to the cradle, the secondary adapter is received into a second recess formed in the primary adapter upon mounting the secondary adapter to the primary adapter, and the second computing device is received into a third recess formed in the secondary adapter upon mounting the second computing device to the secondary adapter. Upon mounting the primary adapter to the cradle, the secondary adapter to the primary adapter, and the second computing device to the secondary adapter, the second and third recesses are disposed within the first recess.

BRIEF DESCRIPTION OF THE SEVERAL VIEWS OF THE DRAWINGS

Exemplary embodiments of the present disclosure will be described below in more detail, with reference to the accompanying drawings, in which:

FIGS. 1A-1C show a cradle configured to be mounted in in a vehicle, according to an exemplary embodiment of the present disclosure.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

Exemplary embodiments of the present disclosure relate to a vehicle entertainment cradle shaped and dimensioned to accommodate a variety of mobile computing devices. For example, the cradle may be a universal cradle shaped and dimensioned to receive a variety of computing devices such as, for example, tablet computers and smartphones having different sizes and shapes. That is, the cradle is configured to receive a variety of different mobile computing devices made by different manufacturers such as the Apple® iPad® or iPhone®, or various tablet computers or smartphones running different operating systems such as, for example, the Android™ operating system. The cradle may be positioned in a variety of locations such as, for example, disposed within a headrest of a seat in a vehicle, mounted to a headrest of a seat in a vehicle, within a seat back of a seat in a vehicle, in an overhead position within a vehicle, mounted in the dashboard or center console of a vehicle, or in any other convenient location of a vehicle.

Figure 1D:
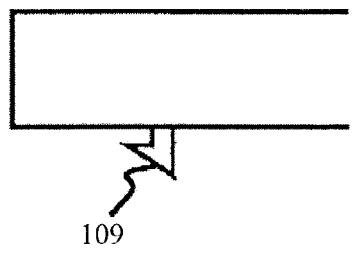
FIGS. 1D-1E show means of mounting the cradle of FIGS. 1A-1C to a headrest in a seat of a vehicle, according to exemplary embodiments of the present disclosure.
Figure 1E:
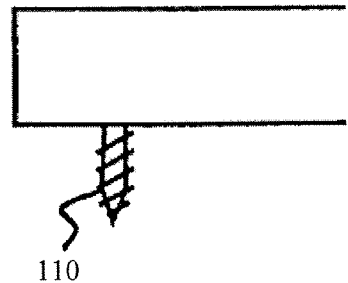
Figure 2A:
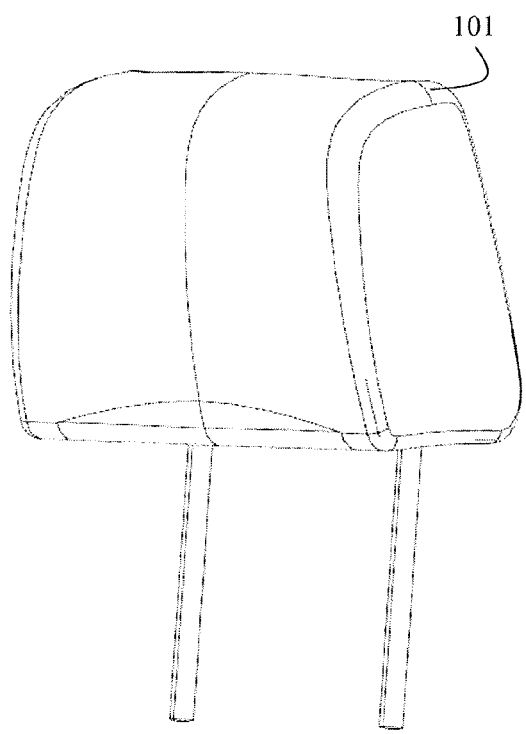
FIGS. 2A-2B and FIG. 3 show a headrest and the cradle of FIGS. 1A-1C mounted to the headrest, according to an exemplary embodiment of the present disclosure.
Figure 2B:
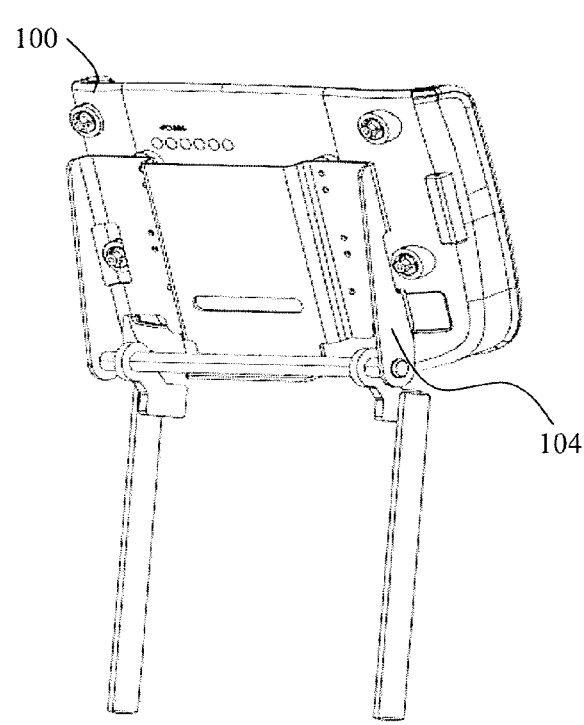
Figure 3:
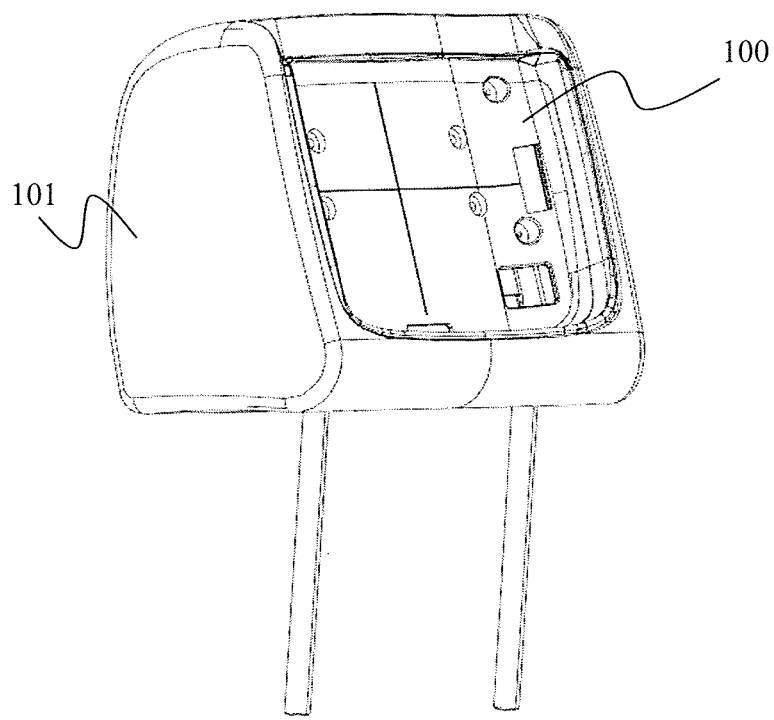

In an exemplary embodiment, a cradle 100 may be attached to or disposed in a headrest 101 of a seat in a vehicle. The cradle 100 is shown in isolation in FIGS. 1A to 1C. FIG. 1A shows a front view of the cradle 100, FIG. 1B shows a side view of the cradle 100, and FIG. 1C shows a rear view of the cradle 100. The cradle 100 may be fixed to the headrest 101 by, for example, catches 109 as shown in FIG. 1D, screws 110 as shown in FIG. 1E, adhesives, or epoxies. FIG. 2A shows a rear view of the headrest 101. FIG. 2B shows the same rear view of FIG. 2A, however, in FIG. 2B, the headrest 101 is removed, showing the internal headrest support structure 104 of the headrest 101. The cradle 100 may be secured to the internal headrest support structure 104 via, for example, screws 110, catches 109, adhesives, or epoxies. As an alternative to mounting to an internal headrest support structure 104, the cradle 100 may be attached (e.g., glued or riveted) directly to the body of the headrest 101. FIG. 3 shows the cradle 100 attached to, and disposed within the headrest 101. The cradle 100 is shaped and dimensioned to receive a primary adapter 102. As shown in FIG. 3, the cradle 100 may be mounted within an interior area the headrest 101, forming a recess. The primary adapter 102 may be received into the recess.

Figure 4:
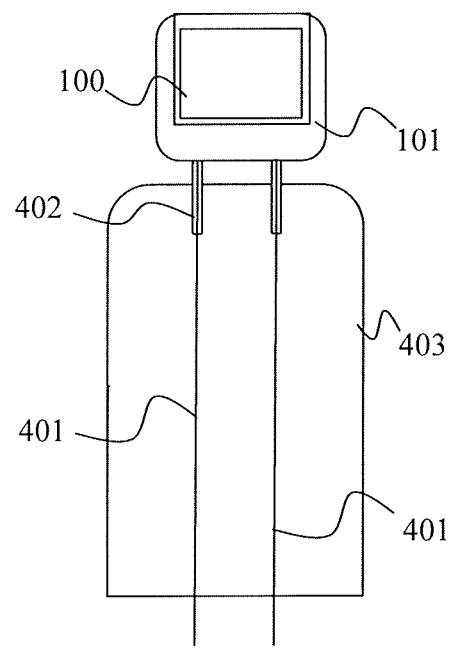
FIG. 4 shows the cradle of FIGS. 1A-1C electrically connected to a power source and/or an audio/video system of a vehicle, according to an exemplary embodiment of the present disclosure.

The cradle 100 may be electrically connected to the power source and/or audio/video system in the vehicle, and may further electrically connect to the primary adapter 102 when the primary adapter 102 is mounted to the cradle 100. As a result, a computing device (e.g., a tablet computer or a smartphone) coupled to the primary adapter 102 may be electrically connected to the vehicle's power system and/or audio/video system. The cradle 100 may be connected to the vehicle power source and/or audio/video system via power and/or data wires 401 connecting to the cradle 100 and passing through a headrest post 402 and the seat 403, as shown in FIG. 4. The wires 401 may pass through a single headrest post 402 or multiple headrest posts 402.

Figures 7A, 7B:
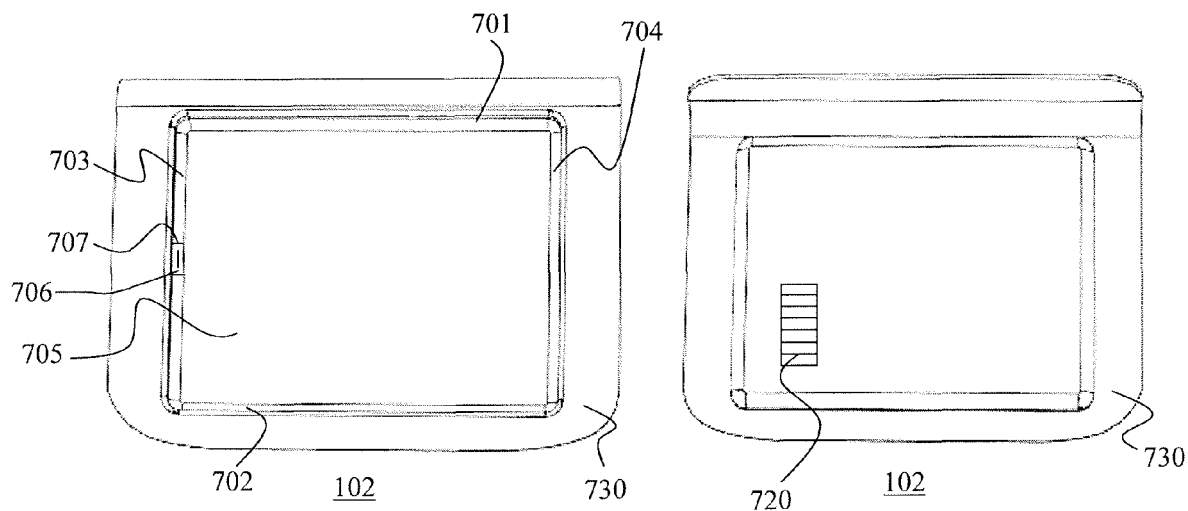
FIGS. 7A-7B show a primary adapter configured to be mounted to the cradle of FIGS. 1A-1C, according to an exemplary embodiment of the present disclosure.

The cradle 100 electrically connects to the primary adapter 102 via an electrical connection disposed on the cradle 100, and a corresponding electrical connection disposed on the primary adapter 102. For example, the electrical connections may be first electrical contacts 710 disposed on a front surface of the cradle 100, and second electrical contacts 720 disposed on a rear surface of the primary adapter 102, as shown in FIGS. 1A and 7B. When the primary adapter 102 is coupled to the cradle 100, the first and second electrical contacts 710 and 720 contact each other, electrically connecting the cradle 100 and the primary adapter 102. The electrical connection established via the first and second electrical contacts 710 and 720 may be utilized to supply power to a device (e.g., a computing device or another adapter) mounted in the primary adapter 102, and to send and receive data between the audio/video system of the vehicle and a device mounted in the primary adapter 102.

Figure 5:
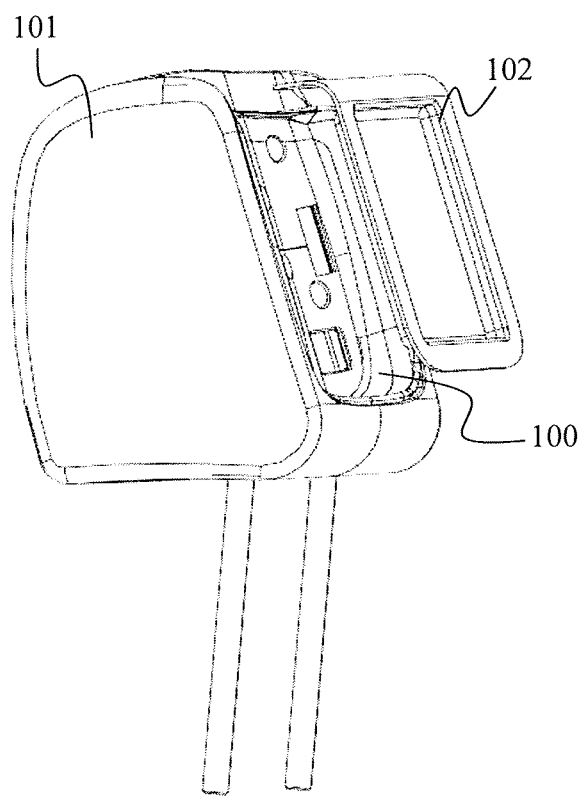
FIG. 5 shows the cradle of FIGS. 1A-1C disposed within a headrest, and a primary adapter configured to be mounted to the cradle, according to an exemplary embodiment of the present disclosure.

FIG. 5 shows the cradle 100 disposed within the headrest 101, and a primary adapter 102 configured to be mounted to the cradle 100. The primary adapter 102 may be attached to the cradle 100 using a variety of mechanisms such as, for example, pressure fitting, catches, snaps, locks, or latches.

Figure 6A:
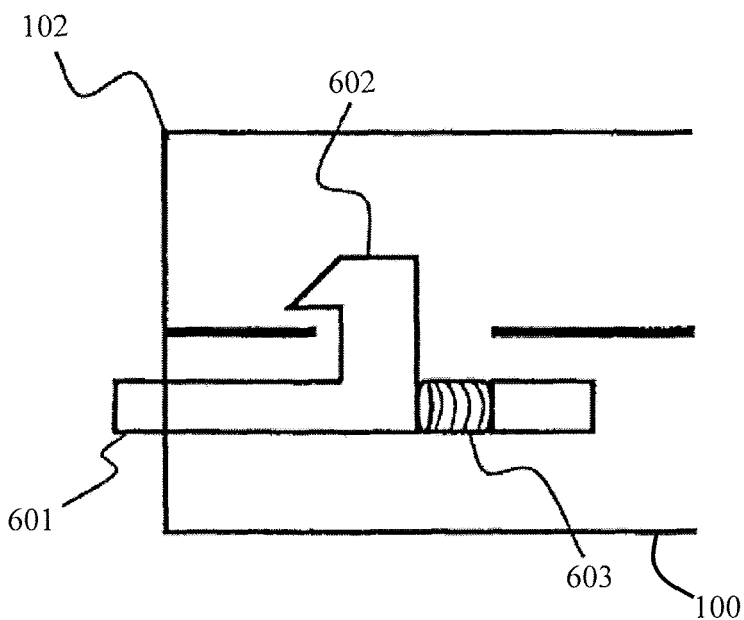
FIGS. 6A-6B show means of securing a primary adapter to the cradle of FIGS. 1A-1C, according to exemplary embodiments of the present disclosure.

For example, as shown in FIG. 6A, the cradle 100 may include a quick release mechanism for securing and releasing the primary adapter 102. The quick release mechanism can include a button 601 for releasing a latch 602, which is secured to the primary adapter 102 by pressing the primary adapter 102 securely into the cradle 100. A latch mechanism comprises a latch 602 that passes into a bottom portion of the primary adapter 102. The latch 602 is momentarily displaced as the primary adapter 102 is coupled with the cradle 100. A spring 603 secures the latch 602 in the bottom portion of the primary adapter 102. The button 601 can be pressed, aligning the latch 602 with an opening in the bottom portion of the primary adapter 102, and the primary adapter 102 can be pulled away from the cradle 100.

Figure 6B:
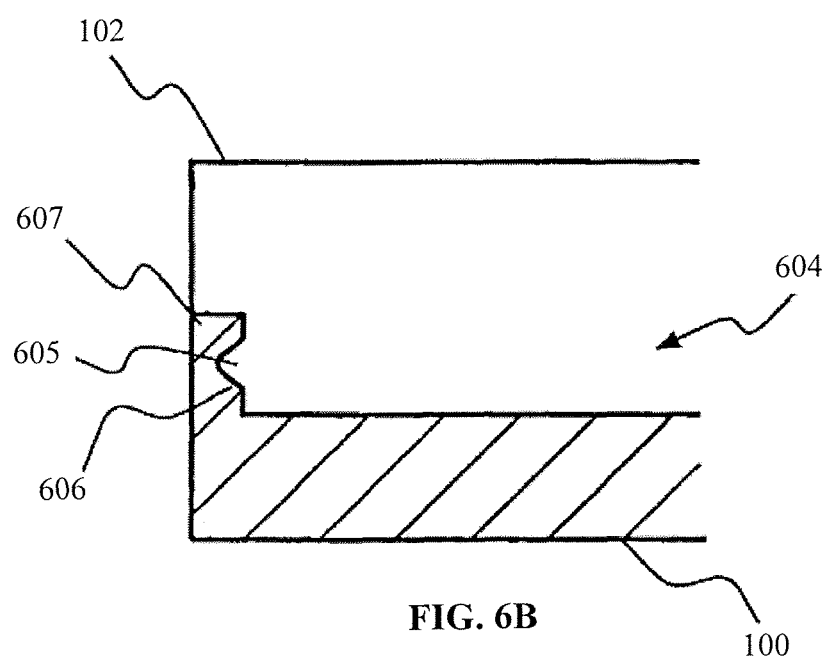

As shown in FIG. 6B, pressure fitting may be utilized such that the primary adapter 102 fits snugly into the cradle 100. For example, a rear portion 604 of the primary adapter 102 can be secured by a protrusion 605 that fits within a notch 606 in the cradle 100. As the primary adapter 102 is pressed into the cradle 100, a wall 607 of the cradle 100 flexes away from the rear portion 604 of the primary adapter 102 until the protrusion 605 is aligned with the notch 606. The protrusion 605 and the notch 606 cooperate to secure the primary adapter 102 to the cradle 100. Thus, the wall 607 of the cradle 100 can be formed of, for example, a flexible thermoplastic rubber.

When coupled to the cradle 100, a bezel 730 on the front portion of the primary adapter 102, as shown in FIGS. 7A and 7B, is flush, or substantially flush, with the front surface of the headrest 100. In addition, a recess formed within the primary adapter 102, which is configured to receive a computing device (e.g., a tablet computer or a smartphone) or a secondary adapter, extends into the recess of the cradle 100 within the headrest 101.

FIG. 7A shows a front view of the primary adapter 102, and FIG. 7B shows a rear view of the primary adapter 102, according to an exemplary embodiment of the present disclosure.

Figure 8A:
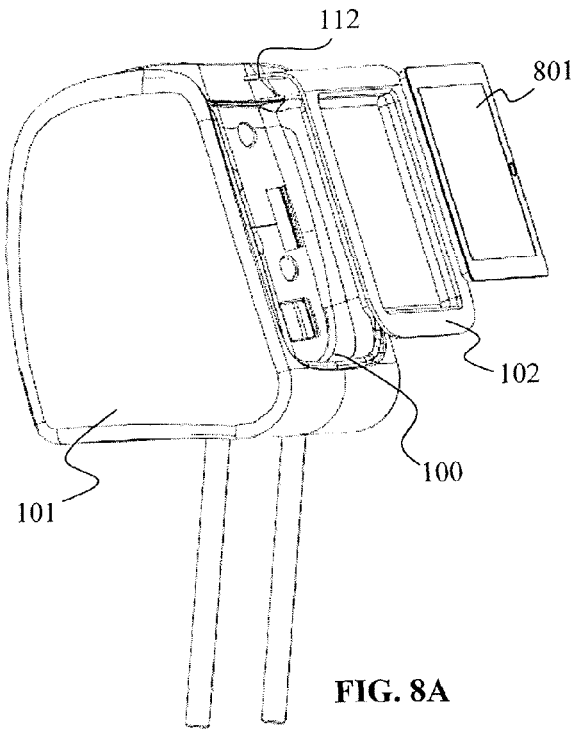
FIGS. 8A-8B show the cradle of FIGS. 1A-1C mounted in a headrest, and a primary adapter configured to be mounted to the cradle and receive a tablet computer, according to an exemplary embodiment of the present disclosure.
Figure 8B:
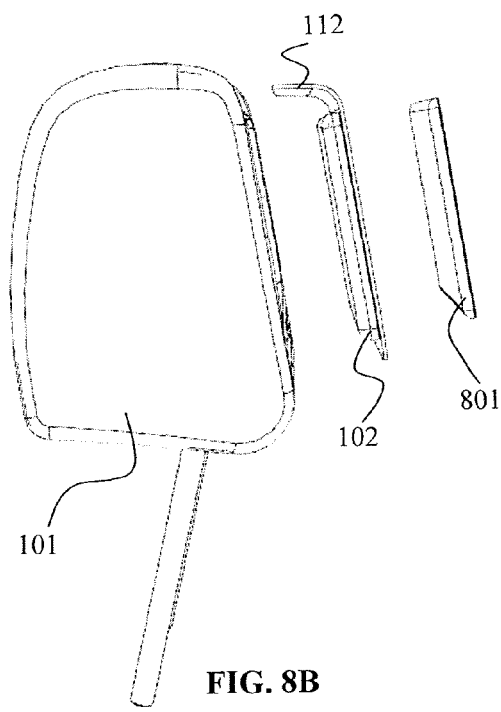

The primary adapter 102 may be configured to directly accommodate a variety of sizes of computing devices. For example, the primary adapter 102 may be shaped and dimensioned to directly accommodate a tablet computer 801 having a size between about 7 inches and about 10 inches, as shown in FIGS. 8A and 8B, or a smartphone having a size between about 3 inches and about 7 inches. When referring to the size of computing devices, the size is an approximation of the diagonal measurement of the computing device's display. Upon mounting the tablet computer 801 or the smartphone to the primary adapter 102, the front surface of the tablet computer 801 or the smartphone may be flush, or substantially flush, with the bezel 730 of the primary adapter 102.

Exemplary embodiments may include a plurality of primary adapters 102 configured to be coupled to the cradle 100, each shaped and dimensioned to receive tablet computers or smartphones having different sizes. For example, the cradle 100 may be configured to receive a first primary adapter 102 shaped and dimensioned to directly accommodate a tablet computer having a size of about 7 inches, a second primary adapter 102 shaped and dimensioned to directly accommodate a tablet computer having a size of about 8 inches, a third primary adapter 102 shaped and dimensioned to directly accommodate a tablet computer having a size of about 9 inches, and a fourth primary adapter 102 shaped and dimensioned to directly accommodate a tablet computer having a size of about 10 inches. The cradle 100 may also receive additional primary adapters shaped and dimensioned to directly accommodate smartphones. The ability to mount different primary adapters 102 into and out of the cradle 100 allows the user to conveniently mount a variety of different sized tablet computers and smartphones to the cradle 100.

In an exemplary embodiment, the primary adapter 102 is configured to be coupled to the tablet computer 801, or a smartphone, via pressure fitting by way of form-fitting lips formed in the primary adapter 102, as shown in FIG. 7A. For example, the primary adapter includes an upper lip 701, a lower lip 702, a first side lip 703, and a second side lip 704. The four lips 701-704 extend from an inner surface 705 of the primary adapter 102, forming a recess within the primary adapter 102. The depth of the recess within the primary adapter 102 is defined by the distance between the inner surface 705 and the outermost portion of the lips 701-704. The depth of the recess may be varied depending on the tablet computer 801, or smartphone, the primary adapter 102 is designed to accommodate, and may be between about 0.25 inches and about 0.6 inches, however the depth is not limited thereto. When mounted to the cradle 100, the recess of the primary adapter 102 is disposed within the recess of the cradle 100. The form-fitting lips 701-704 are formed such that the tablet computer may be inserted into the recess of the primary adapter 102, and retained within the primary adapter 102, by way of a certain amount of force applied by the user. The form-fitting lips 701-704 may include a notch similar to the notch 606 of the cradle 100 shown in FIG. 6B. The edges of the tablet computer 801, or the smartphone, may be secured to the primary adapter 102 via insertion into the notch. That is, as the tablet computer 801, or the smartphone, is pressed into the primary adapter 102, a wall of the primary adapter 102 flexes until the edges of the tablet computer 801, or the smartphone, are inserted into the notch. Utilization of form-fitting lips 701-704 allows a tablet computer 801, or a smartphone, to be conveniently mounted within the primary adapter 102 without making any modifications to the tablet computer 801 or the smartphone.

FIGS. 8A and 8B show the cradle 100 mounted within a headrest 101, and the primary adapter 102 configured to be coupled to the cradle 100 and receive a tablet computer 801, according to an exemplary embodiment. In FIGS. 8A and 8B, pressure fitting is used to couple the primary adapter 102 to the cradle 100, and to mount the tablet computer 801 to the primary adapter 102, however, exemplary embodiments of the present disclosure are not limited to coupling via pressure fitting. For example, coupling may be achieved using a variety of mechanisms such as, for example, screws, catches, snaps, locks or latches. In FIGS. 8A and 8B, the cradle 100 includes two opposing sidewalls, a lower wall, and an opening opposing the lower wall, and the primary adapter further includes an upper wall 112 extending from the top portion of the primary adapter 102 towards the rear of the primary adapter 102. The upper wall 112 fits into the opening at the upper portion of the cradle 100. Inclusion of the upper wall 112 allows a user to conveniently remove the primary adapter 102 from the cradle 100. For example, the user may remove the primary adapter 102 from the cradle 100 by grabbing the upper wall 112 and pulling the primary adapter 102 away from the cradle 100 via the upper wall 112 using a certain amount of force.

The primary adapter 102 may be electrically connected to the cradle 100, as described with reference to FIGS. 1A and 7B, and the tablet computer 801, or the smartphone, may be electrically connected to the primary adapter 102 when mounted to the primary adapter 102. As a result, the tablet computer 801, or the smartphone, is electrically connected to the cradle 100, which is in turn electrically connected to the power source and/or audio/video system of the vehicle. For example, in an exemplary embodiment, the primary adapter 102 includes a connection port 706 disposed on a door 707 on one of the lips 701-704 of the primary adapter 102, as shown in FIG. 7A. The connection port 706 is designed to matingly receive a connector of the tablet computer 801, or a smartphone, and may supply power and transmit and receive data to and from the tablet computer 801 or the smartphone. The connection port 706 may be one of a variety of connection types adapted to connect to different tablet units such as, for example, a USB port (e.g., a microUSB port or a mini-USB port) or other proprietary connection types such as a 30-pin connector compatible with the Apple® iPad® and iPhone®.

The door 707 including the connection port 706 may include a hinge permitting the door 707 to pivot away from the lip 701-704 the door 707 is disposed on and towards the user. For example, when pivoted away from the lip, the door 707 may be substantially parallel to the inner surface 705 of the primary adapter 102. Pivoting the door 707 away from the lip allows the connector of the tablet computer 801, or the connector of a smartphone, to be connected to the connection port 706 on the door 707. Once the tablet unit 801 or smartphone is connected to the connection port 706, the door 707 may be pivoted back towards the lip, resulting in the tablet computer 801, or the smartphone, being disposed within the recess of the primary adapter 102.

The door 707 including the connection port 706 may be spring-loaded, allowing the connection port 706 to be stored beneath the surface of the lip it is disposed on when not in use. This allows the user to couple the tablet computer 801, or the smartphone, to the primary adapter 102 without electrically connecting the tablet computer 801, or the smartphone, to the adapter 102. For example, pressing a spring-loaded door 707 once may lock the door 707 beneath the surface of the lip when the connection port 706 is not in use, and pressing the door 707 again may unlock the door 707, extending the door 707 from the surface of the lip and allowing for the connection of tablet computer 801, or the smartphone, to the connection port 706.

Figure 9A:
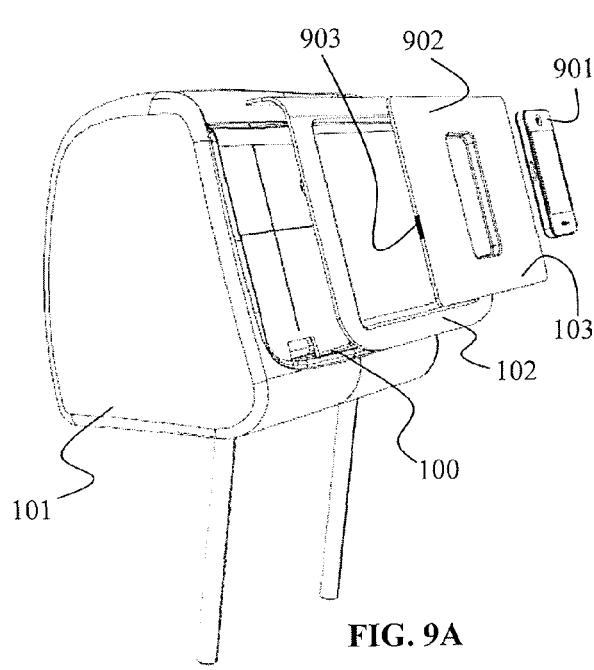
FIGS. 9A-9B show the cradle of FIGS. 1A-1C mounted in a headrest, a primary adapter configured to be mounted to the cradle and receive a secondary adapter, and the secondary adapter configured to receive a smartphone, according to an exemplary embodiment of the present disclosure.
Figure 9B:
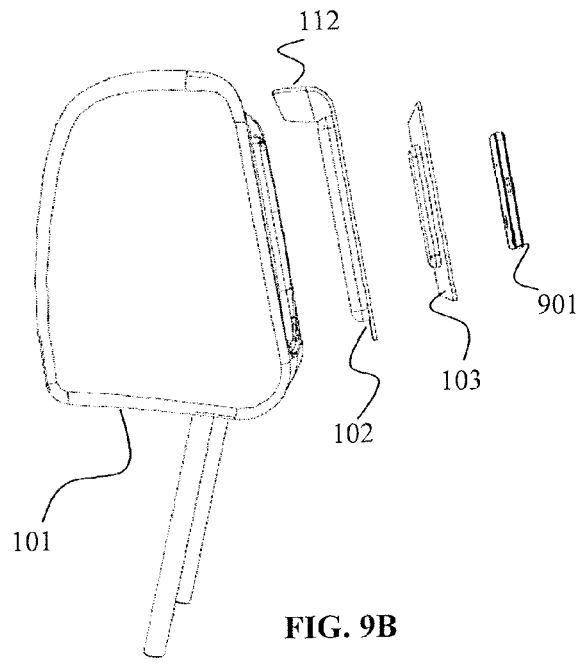

As described above, different sized primary adapters 102 may be swapped into and out of the cradle 100 to allow for a variety of different sized devices, such as different sized tablet computers and smartphones, to be mounted to the cradle 100. In addition, according to exemplary embodiments, a secondary adapter 103 may be coupled to the primary adapter 102. For example, FIGS. 9A and 9B show the cradle 100 mounted within a headrest 101, and the primary adapter 102 configured to be coupled to the cradle 100 and receive a secondary adapter 103. The secondary adapter 103 may be shaped and dimensioned to accommodate a computing device having a smaller size than the computing device accommodated by the primary adapter 102. For example, the primary adapter 102 may be shaped and dimensioned to accommodate a tablet computer 801 having a size between about 7 inches and about 10 inches, and the secondary adapter 103 may be shaped and dimensioned to accommodate a smartphone 901 having a size between about 3 inches and about 6 inches. Upon mounting the smartphone 901 to the secondary adapter 103, the front surface of the smartphone 901 may be flush, or substantially flush, with a bezel 902 of the secondary adapter 103. Further, the bezel 730 of the primary adapter 102, the bezel 902 of the secondary adapter 103, and a front surface of the smartphone 901 may all be flush, or substantially flush, with outer surface of the headrest 101.

Utilization of both the primary adapter 102 and the secondary adapter 103 allows a user to conveniently switch between mounting two different sized devices in the cradle 100. For example, a user can utilize both the primary adapter 102 and the secondary adapter 103 to regularly switch between mounting a tablet computer 801 and a smartphone 901 to the cradle 100. A combination of different sized primary and secondary adapters results in the ability to quickly and conveniently mount a variety of computing devices to the cradle 100.

The secondary adapter 103 may include a design and components similar to that of the primary adapter 102, except that the secondary adapter 102 is smaller than the primary adapter 103 since it is designed to mount within the primary adapter 103, and is designed to receive a computing device having a smaller size than the computing device received into the primary adapter 103. In an exemplary embodiment, the secondary adapter 103 may be mounted to the primary adapter 102 using pressure fitting, however, exemplary embodiments of the present disclosure are not limited thereto. For example, coupling may be achieved using a variety of mechanisms such as, for example, screws, catches, snaps, locks or latches.

In an exemplary embodiment utilizing pressure fitting, the secondary adapter 103 may be coupled to the primary adapter 102 via form-fitting lips similar to the form-fitting lips 701-704 of the primary adapter 102, as shown in FIG. 7A. The form-fitting lips of the secondary adapter 103 form a recess shaped and dimensioned to receive a computing device (e.g., a smartphone 901) having a smaller size than the computing device (e.g., a tablet computer 801) received into the primary adapter 102. The form-fitting lips may include a notch similar to the notch described with reference to the cradle 100 and the primary adapter 102, except that the notch of the secondary adapter 103 is configured to receive the smaller computing device. When the primary adapter 102 and the secondary adapter 103 are both mounted to the headrest 101, the recess of the primary adapter 102 is disposed within the recess of the cradle 100, and the recess of the secondary adapter 103 is disposed within the recess of the primary adapter 102. Thus, the recess of both the primary adapter 102 and the recess of the secondary adapter 103 are disposed within the recess of the cradle 100, resulting in a bezel 902 of the secondary adapter 103 being flush, or substantially flush, with the front surface of the headrest 100 when mounted.

The secondary adapter 103 may further include electrical connections to electrically connect the secondary adapter 103 to the primary adapter 102, which is in turn electrically connected to the cradle 100 and the power source and/or the audio/video system of the vehicle. The electrical connections may be the same electrical connections used to electrically connect the cradle 100 and the primary adapter 102, and the primary adapter 102 and the tablet device 801, as described with reference to FIGS. 1A and 7A-7B. For example, in an exemplary embodiment, the secondary adapter 103 includes a connector 903 disposed on an outer edge, and configured to electrically connect to the connection port 706 disposed on a lip of the primary adapter 102. In an exemplary embodiment, electrical contacts, similar to the electrical contacts 710 and 720 of the cradle 100 and primary adapter 102 shown in FIGS. 1A and 7B, may be included on the inner surface 705 of the primary adapter 102 and the rear surface of the secondary adapter 103, electrically coupling the adapters upon mounting. The secondary adapter 103 may further include a connection port and a corresponding door disposed on one of the form-fitting lips, similar to the connection port 706 and door 707 described with reference to the primary adapter 102 as shown in FIG. 7A.

Figure 10:
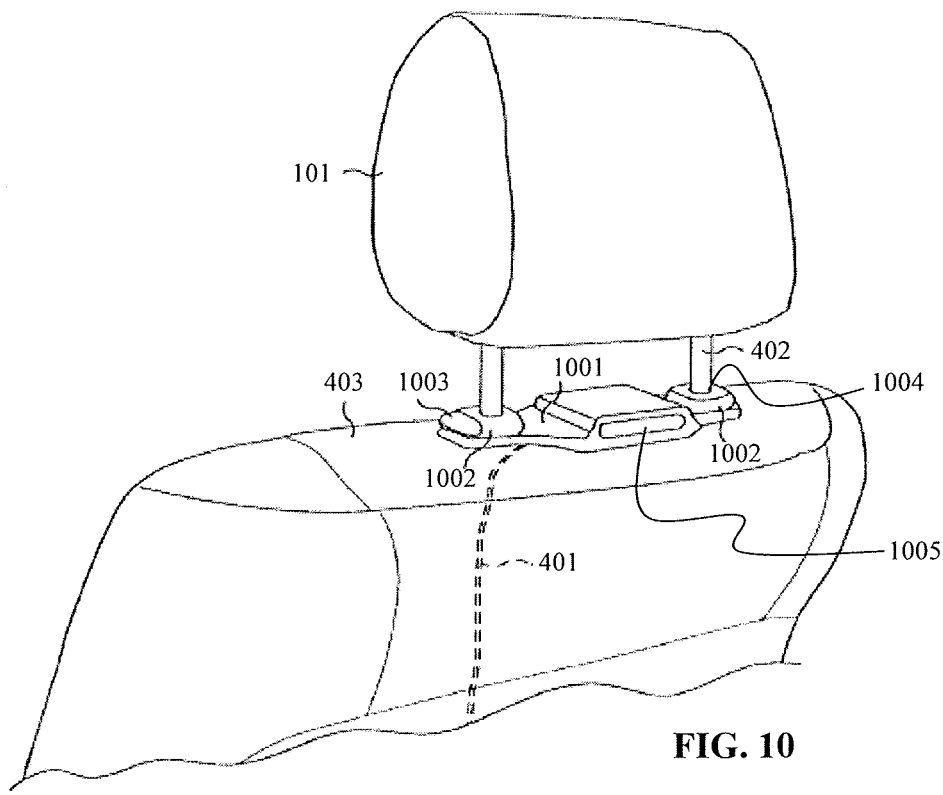
FIGS. 10-11 and FIGS. 12A-12B show a base unit configured to couple the cradle of FIGS. 1A-1C to headrest posts of a headrest in a vehicle, according to exemplary embodiments of the present disclosure.

In exemplary embodiments, the cradle 100 may be attached to a headrest 101 in a vehicle in a manner other than disposing the cradle 100 within the headrest 101. For example, the cradle 100 may be coupled to a base unit 1001, which is in turn coupled to the headrest posts 402 of the headrest 101, as shown in FIG. 10. The base unit 1001 may include openings 1004 corresponding to the headrest posts 402, and may be coupled to the headrest posts 402 by removing the headrest 101 from the seat 403 via headrest retaining clips 1002 and respective lock release buttons 1003 which, when pressed, allow the headrest posts 402 to be raised, lowered, and removed from the seat 403. Once the headrest posts 402 are removed, the base unit 1001 may be coupled by inserting the headrest posts 402 through the openings 1004 of the base unit 1001 and into the seat 403. Alternatively, the base unit 1001 may be coupled in a similar manner without the use of the retaining clips 1002 and respective lock release buttons 1003 by removing the headrest posts 402 from the seat 403, and inserting the headrest posts 402 through the openings 1004 of the base unit 1001 and into the seat 403.

Alternatively, in an exemplary embodiment, the base unit 1001 may be coupled to the headrest posts 402 by bracing against the headrest posts 402, rather than by having the headrest posts 402 inserted through openings 1004 of the base unit 1001. For example, opposing ends of the base unit 1001 may be adjustable in a direction towards and away from the headrest posts 402, and may lock in place at different positions. Thus, the base unit 1001 may be coupled to the headrest posts 402 by extending opposing ends of the base unit 1001 towards the headrest posts 402, and locking the base unit 1001 in place once the opposing ends are braced against the headrest posts 402.

Figure 11:
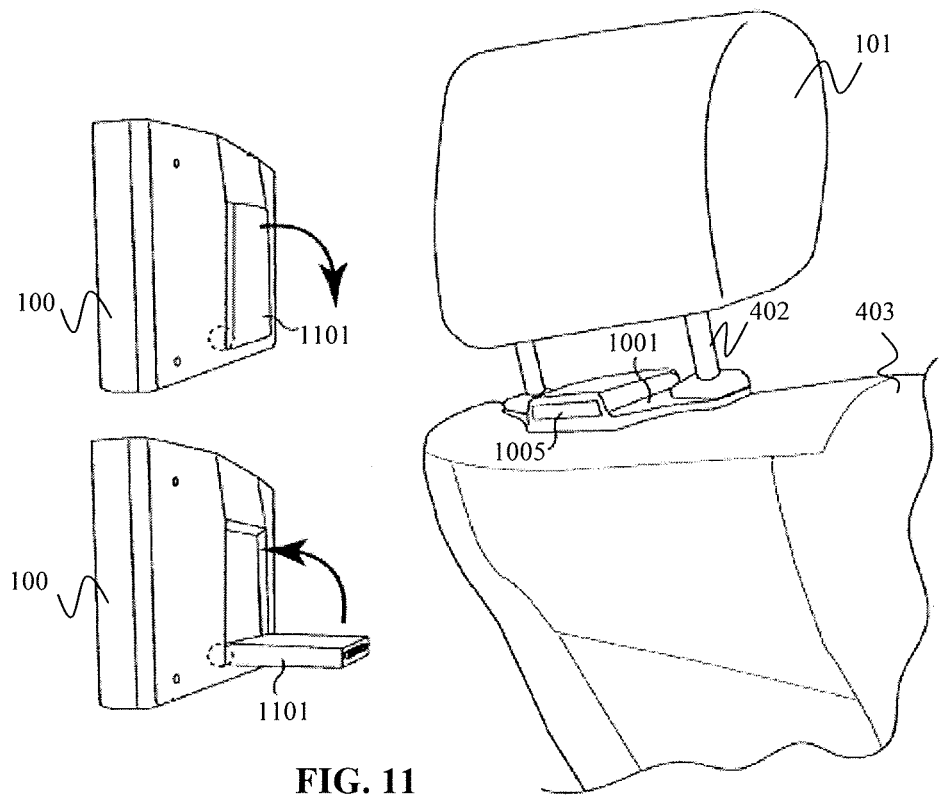
Figure 12A:
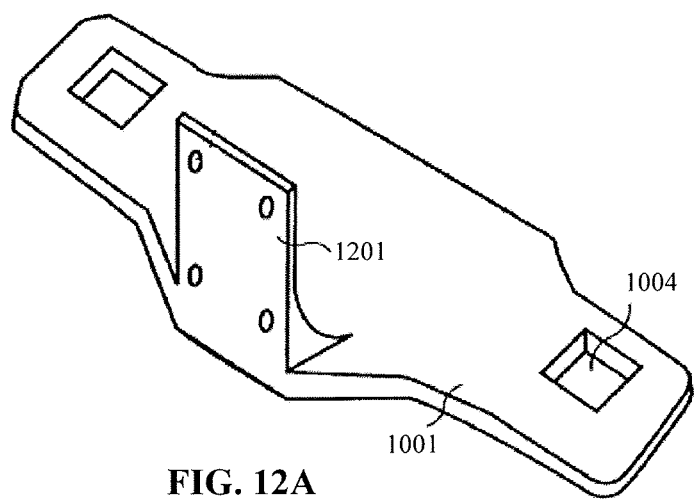
Figure 12B:
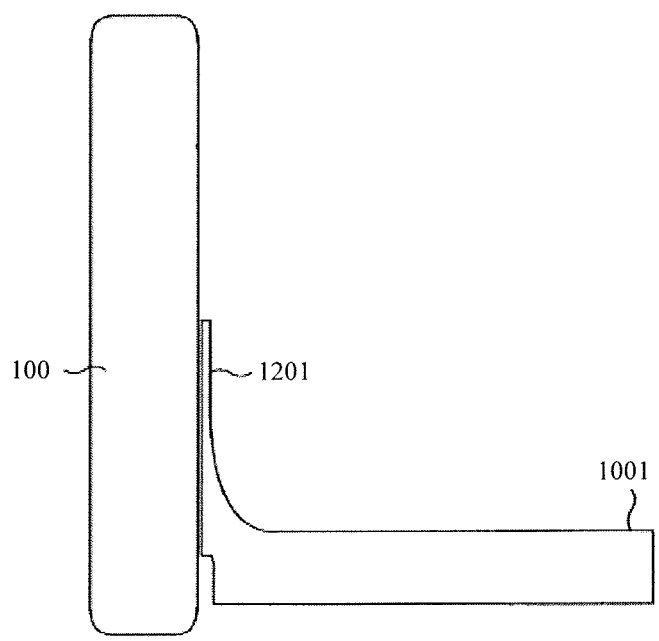

The cradle 100 may be coupled to the base unit 1001 in a variety of manners such as, for example, catches 109 as shown in FIG. 1D, screws 110 as shown in FIG. 1E, adhesives, or epoxies. In an exemplary embodiment, the cradle 100 is coupled to the base unit 1001 via a protrusion 1101 disposed on the rear surface of the cradle 100 that is inserted into a slot 1005 of the base unit 1001, as shown in FIG. 11. The cradle 100 may be electrically coupled to a vehicle's power source and/or audio/video system in a similar manner as described with reference to FIG. 4. Further, the base unit 1001 may be electrically connected with the cradle 100 via mating electrical connections disposed on the protrusion 1101 and in the slot 1005, respectively. The primary adapter 102 may be coupled, and electrically connected to the cradle 100 as described in the exemplary embodiments thereof. In an exemplary embodiment, the protrusion 1101 may be disposed on the base unit 1001, and the slot 1005 may be disposed on the rear surface of the cradle 100. Further, in an exemplary embodiment, the protrusion 1001 and slot 1005 may be replaced with an attachment surface 1201 onto which the cradle 100 may be coupled to using fixing means such as, for example, screws, as shown in FIGS. 12A and 12B.

In exemplary embodiments of the present disclosure, electrical connections may not be included on the cradle 100, the primary adapter 102, and/or the secondary adapter 103. In such embodiments, the user may utilize the cradle 100, the primary adapter 102, and/or the secondary adapter 103 to physically mount computing devices such as a tablet computer 801 and/or a smartphone 901 in a vehicle without electrically connecting the device(s) to the vehicle's power source and/or audio/video system.

In an exemplary embodiment, multiple cradles 100 may be mounted within a vehicle. The multiple cradles 100 may be electrically connected to the vehicle's power source and/or audio/video system, allowing computing devices mounted in the multiple cradles 100 to receive power from the vehicle's power source, transmit and receive data to and from the vehicle's audio/video system, and/or communicate with each other via a common data bus connecting the multiple cradles 100.

According to an exemplary embodiment, when the primary adapter 102 is removed from the cradle 100, a cover can be attached to the cradle 100 to conceal the cradle 100. The cover may include a design and attachment means similar to that of the primary adapter 102, except that the cover does not include form-fitting lips forming a recess. The cover may be manufactured from a material such as, for example, plastic, wood, leather, and/or aluminum.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A mounting system, comprising:
a cradle disposed in a headrest in a vehicle, shaped and dimensioned to removably receive a primary adapter;
the primary adapter comprising a first primary lip, a second primary lip opposing the first primary lip, a third primary lip, and a fourth primary lip opposing the third primary lip, wherein the first to fourth primary lips extend outward from an inner surface of the primary adapter and form a primary recess in the primary adapter; and
a secondary adapter comprising a first secondary lip, a second secondary lip opposing the first secondary lip, a third secondary lip, and a fourth secondary lip opposing the third secondary lip, wherein the first to fourth secondary lips extend outward from an inner surface of the secondary adapter and form a secondary recess in the secondary adapter, and the inner surface of the secondary adapter does not comprise a through hole,
wherein the primary recess is shaped and dimensioned to directly receive one of a first computing device and the secondary adapter, and the first computing device or a bezel of the secondary adapter is substantially flush with an outer surface of the headrest upon mounting the first computing device or the secondary adapter to the primary adapter,
wherein the secondary recess is shaped and dimensioned to directly receive a second computing device having a smaller size than the first computing device,
wherein the cradle, the primary adapter, the secondary adapter, the first computing device, and the second computing device are separable from each other.

2. The mounting system of claim 1, further comprising:
a notch disposed on at least one of the first to fourth primary lips near the inner surface of the primary adapter, wherein the notch is shaped and dimensioned to receive a corresponding one of first to fourth edges of the secondary adapter, and a corresponding one of first to fourth edges of the first computing device.

3. The mounting system of claim 1, further comprising:
a recess formed in the cradle, wherein the recess formed in the cradle is defined by a distance between a front surface of the cradle and a portion of the headrest furthest from the front surface of the cradle, and the recess formed in the primary adapter is disposed within the recess formed in the cradle upon mounting the primary adapter to the cradle.

4. The mounting system of claim 3, wherein the second computing device is substantially flush with the bezel of the secondary adapter upon mounting the second computing device to the secondary adapter.

5. The mounting system of claim 4, wherein the recess formed in the secondary adapter is disposed within the recess formed in the primary adapter upon mounting the secondary adapter to the primary adapter.

6. The mounting system of claim 4, wherein a depth of the recess formed in the secondary adapter is defined by a distance between the inner surface of the secondary adapter and a portion of each of the first to fourth secondary lips of the secondary adapter furthest from the inner surface of the secondary adapter, and the depth is between about 0.25 inches and about 0.5 inches.

7. The mounting system of claim 4, wherein the cradle is electrically coupled to at least one of a power source of the vehicle and an audio/video system of the vehicle.

8. The mounting system of claim 7, further comprising:
a first electrical connection disposed on a front surface of the cradle;
a second electrical connection disposed on a rear surface of the primary adapter;
a first connection port disposed on one of the first to fourth lips of the primary adapter;
a connector disposed on one of first to fourth outer edges of the secondary adapter; and
a second connection port disposed on one of the first to fourth secondary lips of the secondary adapter,
wherein the first and second electrical connections are electrically coupled upon mounting the primary adapter to the cradle, and the first connection port and the connector are electrically coupled upon mounting the secondary adapter to the primary adapter.

9. The mounting system of claim 8, further comprising a door pivotally attached to one of the first to fourth primary lips of the primary adapter,
wherein the first connection port is disposed on the door, and the door is configured to pivot away from the corresponding primary lip to receive the secondary adapter or the first computing device, and towards the corresponding primary lip to secure the secondary adapter or the first computing device within the primary adapter.

10. The mounting system of claim 9, wherein the first connection port is configured to supply power to the first computing device or the secondary adapter, and transmit and receive data to and from the first computing device or the secondary adapter.

11. The mounting system of claim 8, further comprising a door pivotally attached to one of the first to fourth secondary lips of the secondary adapter,
wherein the second connection port is disposed on the door, and the door is configured to pivot away from the corresponding secondary lip to receive the second computing device, and towards the corresponding secondary lip to secure the second computing device within the secondary adapter.

12. The mounting system of claim 11, wherein the second connection port is configured to supply power to the second computing device, and transmit and receive data to and from the second computing device.

13. The mounting system of claim 1, wherein a depth of the recess formed in the primary adapter is defined by a distance between the inner surface of the primary adapter and a portion of each of the first to fourth primary lips furthest from the inner surface, and the depth is between about 0.25 inches and about 0.6 inches.

14. The mounting system of claim 1, wherein the first computing device is a tablet computer having a size between about 7 inches and about 10 inches, and the secondary adapter is shaped and dimensioned to receive a smartphone having a size between about 3 inches and about 7 inches.

15. The mounting system of claim 1, wherein the cradle comprises a first sidewall, a second sidewall opposing the first sidewall, a lower wall, and an opening opposing the lower wall, and the primary adapter comprises an upper wall extending from an upper portion of the primary adapter towards the front surface of the cradle, and configured to fit within the opening of the cradle.

16. A mounting system, comprising:

a cradle disposed in a headrest in a vehicle, shaped and dimensioned to removably receive a primary adapter;

the primary adapter shaped and dimensioned to receive one of a tablet computer and a secondary adapter that does not comprise a through hole, wherein upon mounting the primary adapter to the cradle, a bezel of the primary adapter is substantially flush with an outer surface of the headrest, upon mounting the tablet computer to the primary adapter, a front surface of the tablet computer is substantially flush with the bezel of the primary adapter, and the cradle, the primary adapter and the tablet unit are separate components; and the secondary adapter shaped and dimensioned to receive a smartphone, wherein upon mounting the secondary adapter to the primary adapter, a bezel of the secondary adapter is substantially flush with the bezel of the primary adapter, and upon mounting the smartphone to the secondary adapter, a front surface of the Smartphone is substantially flush with the bezel of the secondary adapter.

17. The mounting system of claim 16, wherein the primary adapter is received into a first recess formed in the cradle upon mounting the primary adapter to the cradle, the secondary adapter is received into a second recess formed in the primary adapter upon mounting the secondary adapter to the primary adapter, the smartphone is received into a third recess formed in the secondary adapter upon mounting the smartphone to the secondary adapter, and upon mounting the primary adapter to the cradle, the secondary adapter to the primary adapter, and the smartphone to the secondary adapter, the second and third recesses are disposed within the first recess.

18. A mounting system, comprising:

a cradle coupled to a seat in a vehicle, shaped and dimensioned to removably receive a primary adapter;

the primary adapter shaped and dimensioned to receive one of a first computing device having a first size and a secondary adapter, wherein the secondary adapter does not comprise a through hole; and the secondary adapter shaped and dimensioned to receive a second computing device having a second size smaller than the first size, wherein the cradle, the primary adapter, the secondary adapter, the first computing device and the second computing device are separate components.

19. The mounting system of claim 18, wherein the cradle is coupled to at least one headrest post of a headrest in the vehicle.

20. The mounting system of claim 18, wherein the primary adapter is received into a first recess formed in the cradle upon mounting the primary adapter to the cradle, the secondary adapter is received into a second recess formed in the primary adapter upon mounting the secondary adapter to the primary adapter, the second computing device is received into a third recess formed in the secondary adapter upon mounting the second computing device to the secondary adapter, and upon mounting the primary adapter to the cradle, the secondary adapter to the primary adapter, and the second computing device to the secondary adapter, the second and third recesses are disposed within the first recess.

* * * * *